Oct. 20, 1931.  K. E. PEILER  1,828,438
METHOD OF AND APPARATUS FOR FEEDING MOLTEN GLASS
Filed March 25, 1922   3 Sheets-Sheet 3
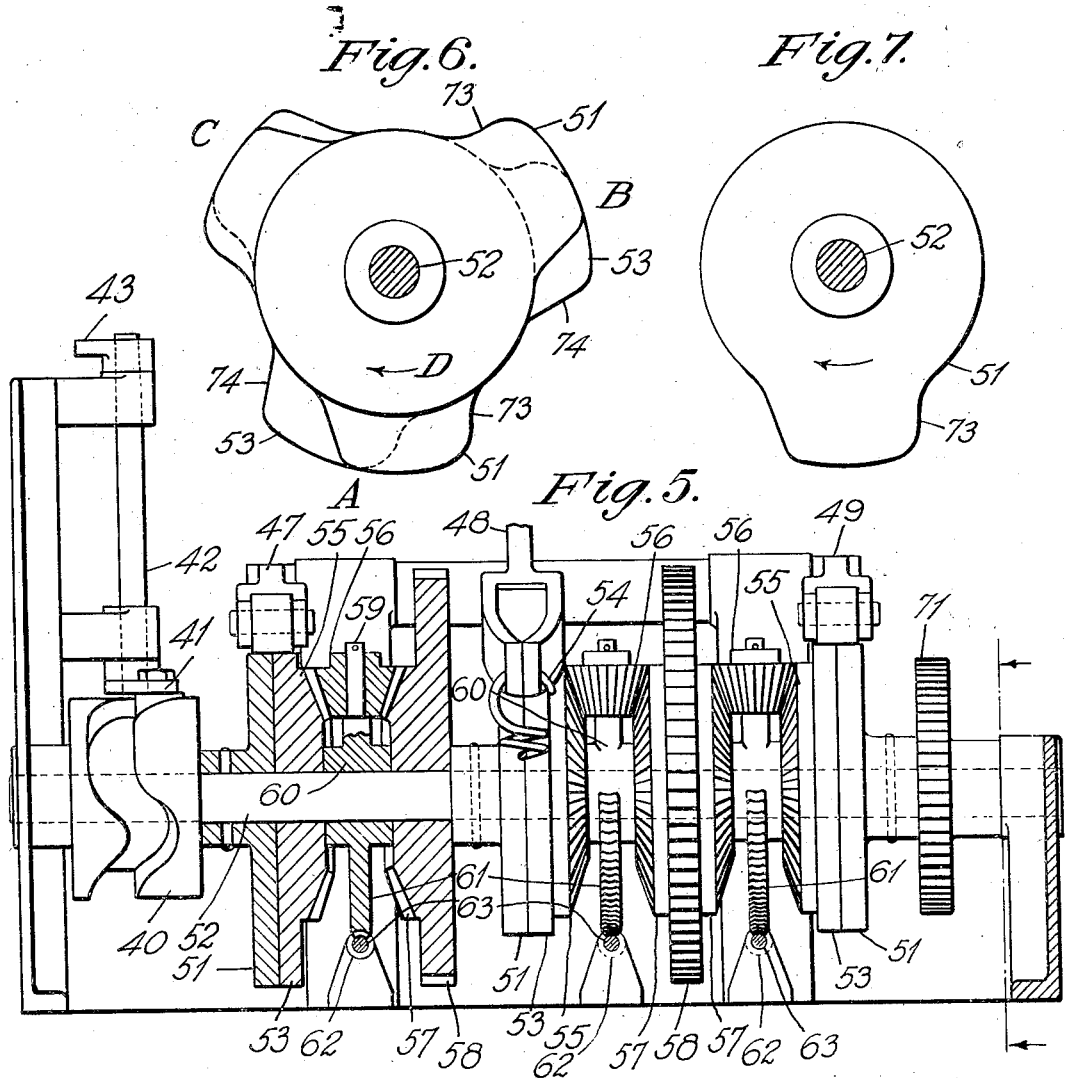
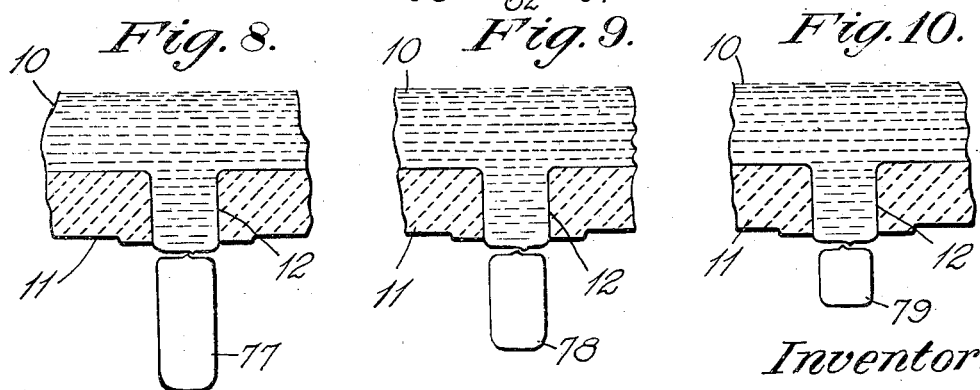
Inventor:
Karl E. Peiler
by W H Honiss
Atty.

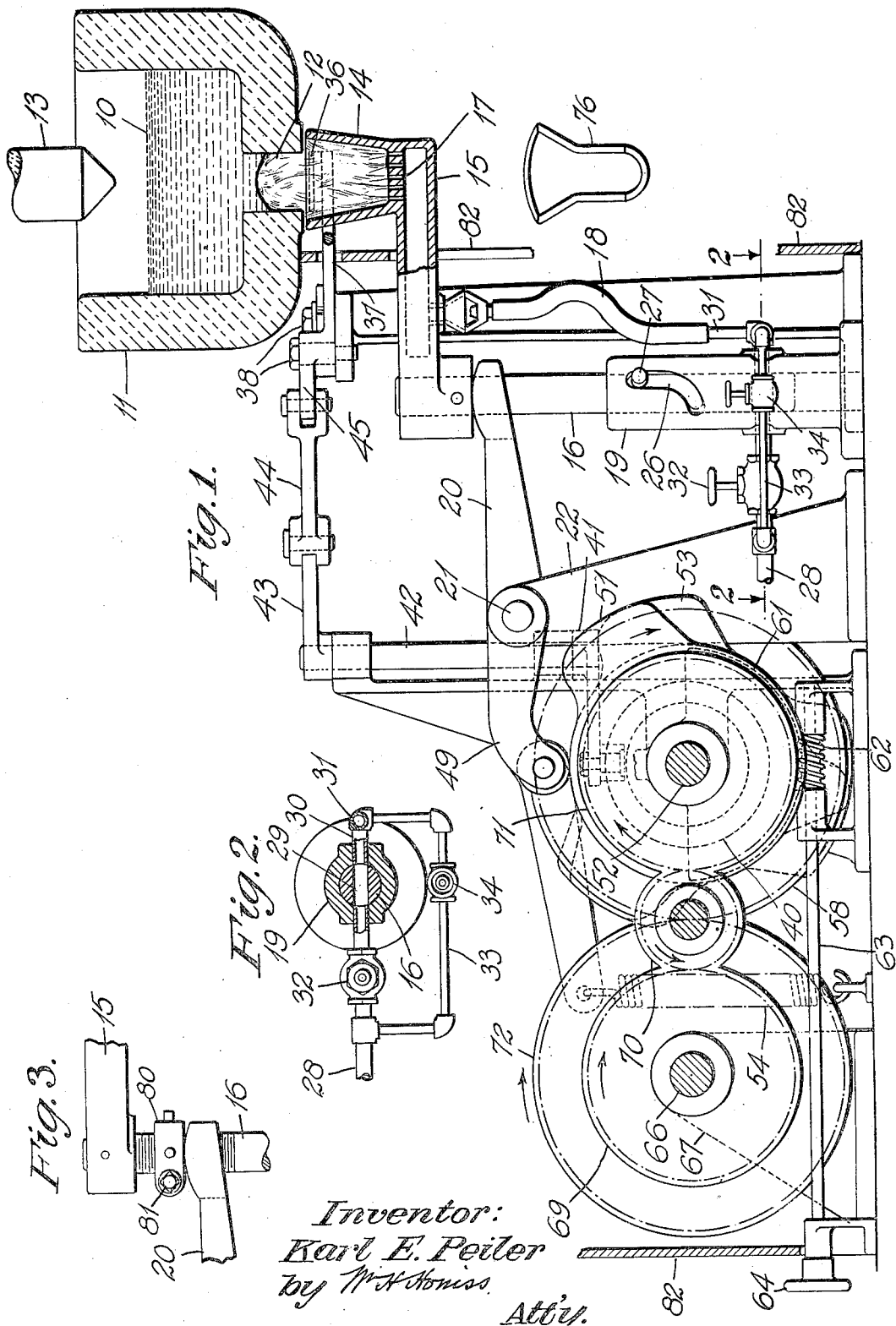

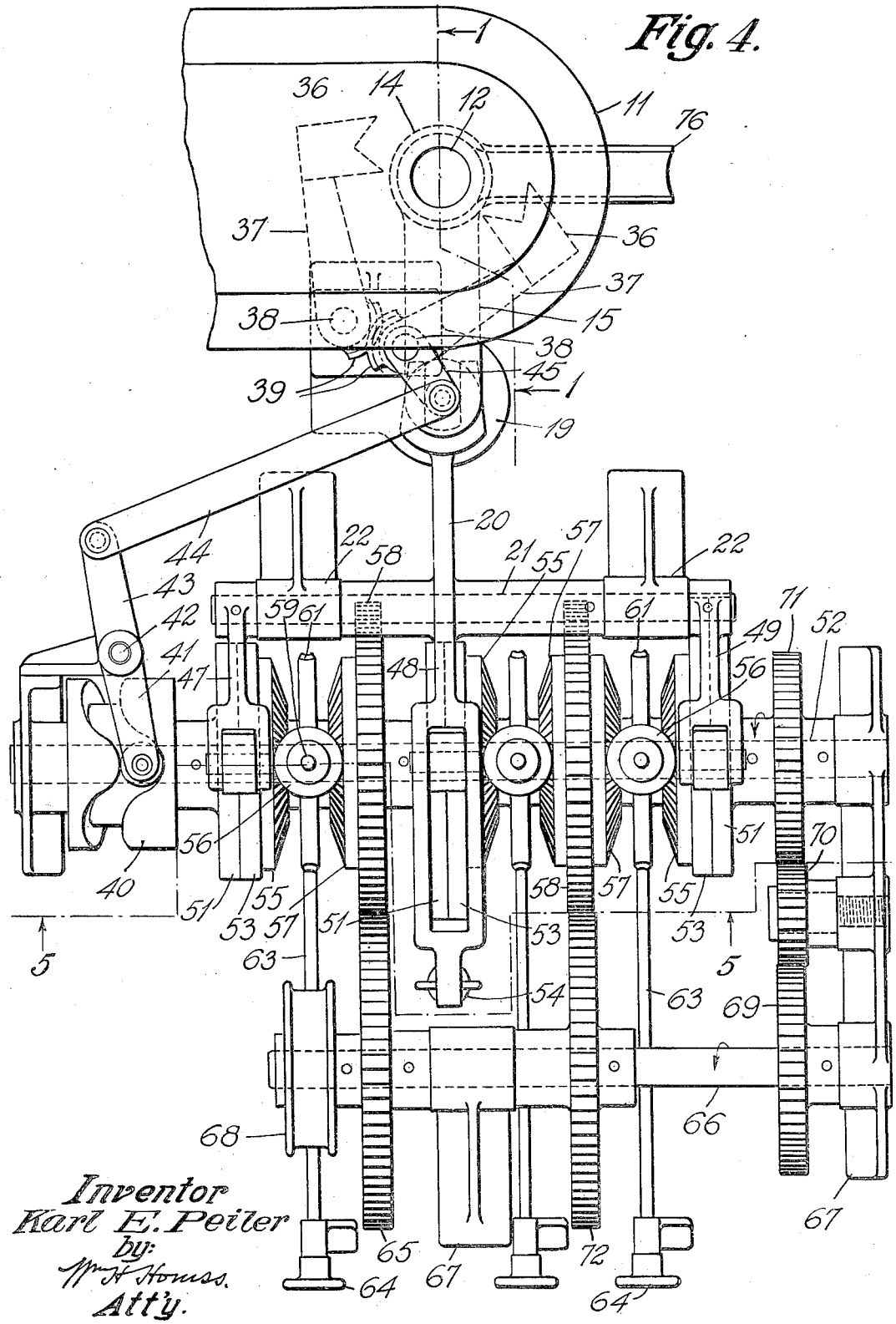

Patented Oct. 20, 1931

1,828,438

UNITED STATES PATENT OFFICE

KARL E. PEILER, OF WEST HARTFORD, CONNECTICUT, ASSIGNOR, BY MESNE ASSIGNMENTS, TO HARTFORD-EMPIRE COMPANY, OF HARTFORD, CONNECTICUT, A CORPORATION OF DELAWARE

METHOD OF AND APPARATUS FOR FEEDING MOLTEN GLASS

Application filed March 25, 1922. Serial No. 546,552.

This invention relates to methods of and apparatus for separating molten glass into charges for use in the molds of glassware shaping machines.

The object of the present invention is to provide a method and apparatus for automatically separating molten glass into mold charges of two or more alternately or successively different sizes or weights by a single feeding machine, varying in regular succession and in predetermined cycles, so that articles of different weights may be made in alternation by two or more associated sets of molds or shaping machines. These mold charges are delivered to different size molds, either of a single shaping machine, or of two or more shaping machines. For delivering and distributing the mold charges to their respective molds, the apparatus shown in U. S. Patent No. 1,373,202 may be employed.

This object is attained by varying the duration of successive discharge periods of the glass so that successively larger or smaller quantities of glass will be discharged for the severance of mold charges therefrom. The discharge periods are preferably determined by the movement of an implement which operates upon the glass in or below the discharge outlet to interrupt the discharge for varying periods.

One feature of the invention is the control of the different discharge periods by the difference in the pneumatic pressure above and below the outlet. For this purpose, the invention comprises means for applying pneumatic pressure to the glass in or below the outlet to retard, stop or reverse the movement of the glass.

The invention provides means operating in varying time periods to retard the flow of glass through the discharge outlet, preferably by delivering a retarding or restraining medium upwardly into contact with the glass or into the outlet from below to check the flow of glass for the desired periods of time. By varying these periods the flow periods of the glass will likewise be varied and consequently, regardless of the fact that the severing periods may be equal, mold charges of different weights will be successively produced. In the embodiment disclosed herein the maximum flow period will not be greater than the period between two successive shearing operations. For every revolution of the cam shaft three shearing operations will take place and between these operations the glass flowing periods will be varied the desired amounts. This is preferably effected by the use of a cup shaped gas burner, from which the products of combustion are delivered into contact with the stub of the previously severed charge both to reheat the stub and to check its flow for the desired length of time. The pressure may be made sufficient to force the glass up into the discharge outlet in order that it may be more completely reheated by and reabsorbed into the supply of glass above the outlet.

These, and other features of the invention will best be understood from the following description and accompanying drawings in which:—

Figure 1 is a side elevation in section, on the line 1—1 of Fig. 4;

Fig. 2 is a sectional plan taken on the line 2—2 of Fig. 1;

Fig. 3 is a detail view in elevation, showing a modification;

Fig. 4 is a plan view showing a part of the forehearth of a furnace;

Fig. 5 is a vertical section taken substantially on the line 5—5 of Fig. 4;

Fig. 6 is a side elevation of the cams by which the discharge of glass from the outlet is controlled;

Fig. 7 is a detail in elevation of one of the cam elements; and

Figs. 8, 9 and 10 are diagrammatic views showing three different sizes of mold charges which may be produced by the same adjustment of the apparatus.

The molten glass 10 to be separated into mold charges is held in a suitable container, such for example as a forehearth 11 projecting from a glass furnace of the usual type. The bottom of the forehearth is provided with an outlet 12 through which the glass is discharged. A plug or plunger 13 of any well-known type, and adjustable by well-known means may be provided to regulate the flow, or to close the orifice when the operation of the apparatus is to be interrupted.

The discharge of glass from the outlet is preferably controlled wholly or in part by an implement movable with respect to the orifice, to permit or retard or interrupt the discharge of glass therefrom. This implement is herein shown in the form of a pressure cup or bowl 14 carried on the end of an arm 15 fixed on a vertical rod 16. The bottom of the cup is perforated at 17 for the passage of fluid under pressure, which may be a gas which burns within the cup and at controlled and variable periods applies heat and pneumatic pressure to the glass below or in the outlet to retard or, if desired, force the glass in or below the outlet back toward the supply. The arm 15 is hollow and is connected with a flexible tube 18 through which the supply of gas or other fluid is delivered to the cup.

The cup is arranged to move vertically toward and from the orifice and, in order to prevent interference with the dropping of the mold charge, it is also swung to one side when lowered. The rod 16 is loosely mounted in a standard 19 and the rod and cup are moved vertically by a lever 20 fixed on a rock shaft 21 mounted in suitable bearings 22. The swinging movement of the cup to move it laterally to and from below the orifice, may occur during its vertical movement and for this purpose a cam slot 26 formed in the standard 19 guides a pin 27 fixed in the shaft 16. By this construction, as the pin 27 on its downward movement reaches the curved portion of the cam slot 26, the cup will be swung to one side, out of the way of the falling mold charge, returning through the same path.

The pressure of the air or other fluid within the cup 14 retards the discharge from the outlet and may also force the stub of glass remaining after the mold charge has been severed, back into the orifice 12 as shown in Fig. 1. When gas or any burning mixture is used, means are preferably provided for controlling the combustion within the cup and for reducing the gas supply when the cup is in inoperative position so as to leave a reduced pilot light by which the gas is ignited when the supply is increased as the cup approaches operative position.

The supply of gas is controlled by a valve actuated by the vertical movement of the cup, which cuts off the main supply of gas as the cup is lowered into inoperative position, and permits gas to be fed to the cup only by means of a small by-pass which supplies the pilot light. The gas is delivered to the tube 18 through a pipe 28 connected with the standard 19 (Figs. 1 and 2) in such position that when the cup approaches its highest position, a passage 29 extending diametrically through the lower end of the rod 16, provides communication with a pipe 30 connected by a pipe 31 with the tube 18. A throttle valve 32 is positioned in the pipe 28 near the standard 19, by which the flow of gas may be regulated by hand. The reduced pilot light is supplied by a constant reduced flow of gas through a by-pass 33 connecting the pipes 28 and 31 on the opposite sides of the standard 19 and throttle valve 32. The by-pass is provided with a throttle valve 34 by which the quantity of gas supplied to the pilot light may independently be regulated. By this construction, when the rod 16 is elevated, a large flame exists in the cup 14 and this flame may be regulated by the valve 32. When the cup is lowered, the flame is decreased and the pressure reduced by the interruption of the main supply by the valve action of the rod 16, and a small flame continues in the cup merely for the purpose of ignition when the cup is again elevated and the main supply again admitted.

The means shown for severing the mold charge comprises shear blades 36 mounted on arms 37 pivotally mounted on studs 38 and connected by gear segments 39. The shear blades are actuated by a three lobed cam 40 fixed on the shaft 52, through connections comprising a cam lever 41, shaft 42, arm 43, link 44 and an arm 45 fixed on one of the shear arms 37, the arrangement being such as to sever the glass after uniform intervals.

The cup is held in elevated position to retard or prevent the discharge of glass for a variable period after each severing operation and the size of each mold charge is determined by the time at which the cup is lowered to permit discharge.

The cup is reciprocated through the movement of the lever 20, by a cam mechanism, and in order that the successive actuations of the cup may produce mold charges varying successively in a predetermined cycle, the lever 20 is actuated by a plurality of cams corresponding in number to the different sizes of mold charges which are to be produced. In the illustrated embodiment of the invention, the lever is actuated by three cams and therefore three different sizes of mold charges may be produced, but the number of the cams may be increased or decreased as desired.

In order that the size of each mold charge may be independently adjusted, each cam comprises two members of which one is adjustable with respect to the other. The time of lifting the cup to stop or restrain the discharge of glass after severing is not necessarily adjustable, as under ordinary circumstances the cup would be lifted at uniform intervals soon after each actuation of the shears. Therefore the cam members which lift the cup are shown as remaining in a fixed relation to the shear cam 40. The lever 20 is fixed on its rock shaft 21 which carries three fixed cam arms 47, 48 and 49, each carrying a roll in engagement with a cam. Each cam comprises a cup lifting member 51 (Fig. 7) fixed on a shaft 52 and an adjustable cup lowering member 53, which may have the same contour as the fixed cam member 51. The cam member 53 is adjusted to produce a variable timing of the complete cam by turning it about the shaft 52 so that its lobe projects circumferentially to a greater or less extent beyond the corresponding lobe on the fixed cam. By this construction the effective time of each cam may be adjusted from a minimum when the two cam lobes are in juxtaposition, to a maximum where the lobes overlap but slightly (Fig. 6). A spring 54 for holding the rolls toward the cams, may be applied as shown, to one of the cam arms extended for that purpose.

The cam members 53 are capable of adjustment during the operation of the machine. For this purpose each of the cam members 53 has formed integral therewith, a bevel gear 55 (Fig. 5) in mesh with a pinion 56 which also meshes with a bevel gear 57 on the side of a spur gear 58. The pinion 56 is loosely mounted on a stud 59 projecting from a sleeve 60 loosely mounted on the shaft 52. The cam member is driven through the pinion 56 by, and in the opposite direction from the gear 58. The relation between the bevel gears 55 and 57 is adjusted by turning the sleeve 60 about the shaft 52. For this purpose, the sleeve 60 is provided with a segmental worm gear 61 in mesh with a worm 62 on a shaft 63 supported in suitable bearings and provided with a hand wheel 64 by which it may be turned to vary the angular position of the sleeve 60 and pinion 56, thus varying the angular relation between the adjustable cam member 53 and its associated cam member 51. The gears 58 are driven by gears 65 and 72 fixed on a shaft 66 carried in bearings 67, and driven by a pulley 68 connected with a suitable source of power. The shaft 52 is driven by the shaft 66, but in order that both members 51 and 53 of each cam may rotate in the same direction, a reversing device is introduced in the drive between the shafts 66 and 52 to reverse the rotation of the gears 57 and 58 relative to the shaft 52. The shaft 66 carries a gear 69 meshing with an idle pinion 70 driving a gear 71 fixed on the shaft 52, which is thus made to rotate in the same direction as the cam members 53. The gear 72 on the shaft 66 drives both the cams which actuate the arms 48 and 49 by a bevel gear 57 on each side of the driven gear 58.

The cam members 51, (Figs. 1, 6 and 7) fixed on the shaft 52, are each provided with an inclined portion 73 which produces the upward movement of the cup to restrain the discharge of glass. By fixing the shear cam 40 and cup lifting cam members 51 both on the shaft 52, the severing operation and the subsequent upward movement of the cup occur in fixed time relation. This relation may however be made adjustable, if desired, by providing a clamp or a set screw, to adjustably secure the cam 40 on the shaft 52. The adjustable cam members 53 have inclined portions 74 which effect the downward movement of the cup to permit discharge. The cams turn in the direction of the arrows (Figs. 1, 6 and 7), from which it will be seen that the circumferential extent of the high portion of the cams as viewed in Figs. 1 or 6, determines the duration of discharge, the cup being down during this time. The times at which discharge may start is determined by the relative adjustments of the cam members 53 by which the angular distances between their inclined portions 73 and 74 may be varied.

The pressure within the cup 14 may be regulated by the valve 32 as has been described and, if desired, the pressure may also be regulated by varying the space between the top of the cup and the bottom of the forehearth, thus allowing the pressure to escape more or less. In order to facilitate such an adjustment, the device shown in Fig. 3 may be interposed between the cup and its actuating mechanism. In this construction, the arm 15 is secured to the upper end of the rod 16 and a collar 80 is threaded on the rod and rests upon the forked end of the lever 20. The cup may be adjusted vertically by turning the collar, a clamp screw 81 being provided to secure it in adjusted position.

A part of a cover or housing 82 is shown in Fig. 1 which may be employed to enclose and protect the mechanism, suitable slots being provided for the passage of the handwheels 64 and other projecting parts.

In the operation of the apparatus, starting with the cup in elevated position as shown in Fig. 1, the discharge of glass from the outlet is retarded by the pneumatic pressure of the burning gas or other fluid. The pressure may be regulated so as to permit a slow discharge, or hold the glass stationary, or to force the stub back into the outlet as illustrated, by adjusting the gas supply by means of the valve 32 or by adjustment of the collar 80. The downward movement of the cup to permit discharge, is produced by the incline 74 on the adjustable cam members 53 and the time at which this occurs is determined by the described adjustment of the several cam members 53. As the cup moves downwardly, the glass commences to discharge from the outlet 12 and the flame within the cup is reduced to a pilot light by the valve action of the rod 16. As the cup approaches its lowermost position, it swings to one side and the shears are actuated to sever the mold charge, which thereupon falls into a chute 76 by which it may be directed to the proper associated shaping machine as shown in the aforementioned Patent No. 1,373,202. The cup is then lifted under the control of the incline 73 on the fixed cam 51 and at the same time the flame within the cup is increased, to retard further discharge or to force the stub of glass remaining from the previous mold charge, back toward or into the outlet as shown in Fig. 1. The size of the mold charge is de-determined by the duration of the discharge period and this period is independently adjustable for each charge, by manipulation of the hand wheels 64.

Mold charges which may be produced by adjustment of the apparatus, are shown in Figs. 8, 9 and 10. Fig. 8 shows a comparatively large mold charge 77 which would be produced by an adjustment of the cam member 53 so that the circumferential extension of the two cam lobes approaches maximum, as shown at A (Fig. 6). The advanced position of the cup lowering cam member 53 causes the cup to lower earlier in the cycle and thus allows a longer discharge period. Fig. 9 shows a shorter mold charge 78 such as might be produced by the less advanced position of the member 53 as shown at B, while Fig. 10 shows a small mold charge 79 corresponding approximately to the adjustment of the cam lobes shown at C, in which the cup is lowered much later, producing a short discharge period. As is now well understood in the art of gob or intermittent feeding, it is advisable to start the glass flowing freely and regularly at the proper rate, temperature and other conditions through the open discharge outlet before putting the pressure cup or other intermitting devices into operation. The rate of flow, regulated by the plunger 13, or by the height of hydrostatic head over the outlet, or in any other well known way, should be rapid enough to discharge during the time period occupied by a single cycle of operation of the cup, a quantity of glass of a weight at least equal to and preferably exceeding the weight of the heaviest gather of the series to be made. The pressure cup may then be put in operation, and the respective cam lobes 53 independently adjusted by the hand wheels 64, so as to withdraw the pressure cup at the varying times required for starting the flow to produce the desired different weights of mold charges.

The operation of the apparatus is given by way of illustration only and the apparatus is capable of adjustment to modify the size and character of the mold charges in accordance with the requirements of the ware being produced. In the illustrated embodiment of the invention the size of the mold charge is varied by changing the duration of the discharge period, the discharge being controlled by the difference between the pneumatic pressure on the glass above and that in or below the outlet. If desired, the cams may be so adjusted as to provide for the production of two successive mold charges of equal weight followed by a third charge of a different weight, or the weight of the charges may be varied in any other predetermined order desired, depending upon the number and adjustment of cams used.

Any suitable means (not shown) may be provided for controlling and regulating the pressure of the fluid or flowing medium to be used for successively retarding the flow of glass in varying time periods, regardless of whether it be in the form of a combustible mixture or otherwise.

Having disclosed the broad idea of the invention, it is within the skill of an artisan to introduce various modifications within the scope of the appended claims.

I claim:—

1. The method of segregating molten glass to form mold charges of weights varying in a regular order in periodically recurring cycles, which comprises intermittently discharging the glass through an outlet intermittently retarding issuance of glass from the outlet by an implement movable below the outlet, periodically severing mold charges from the discharged glass, and periodically varying the length of the successive discharge periods in each of said cycles in accordance with the schedule of weights desired.

2. The method of segregating molten glass to form mold charges of weights varying in a regular order in periodically recurring cycles, which comprises intermittently discharging glass through an outlet intermittently retarding issuance of glass from the outlet by an implement movable below the outlet, periodically severing mold charges from the discharged glass with constant frequency and proportioning the lengths of the successive discharge periods in each of said cycles in substantial accordance with the weights of the mold charges to be discharged.

3. The method of segregating molten glass to form mold charges of weights varying in a regular order in periodically recurring cycles, which comprises discharging the glass intermittently through an outlet intermittently retarding issuance of glass from the outlet by an implement movable below the outlet, periodically severing mold charges from the discharged glass and varying the length of the successive discharge periods in each of said cycles by periodically varying the time of beginning those periods while maintaining constant the intervals between successive severing operations.

4. The method of segregating molten glass to form successive mold charges of different weights in periodically recurring cycles, which comprises intermittently discharging the glass through an outlet, retarding the discharge at the ends of equal time periods in each of said cycles, and resuming the normal discharge at the ends of unequal time periods.

5. The method of segregating molten glass to form a series of mold charges of periodically varying weights, which comprises discharging the glass intermittently through an outlet periodically severing mold charges from the discharged glass, and varying the relative time periods of successive intermissions and their succeeding discharges in a cyclic order while maintaining constant the frequency of the instants of beginning of said intermissions to produce the series of mold charges of the varying weights desired.

6. The method of separating molten glass to form successive mold charges of periodically varying weight, which comprises intermittently discharging the glass through an outlet in periodically recurring cycles of equal duration, periodically varying the time of beginning each successive discharge without varying the time of ending of such discharge to effect the desired changes in weight, and severing the discharged glass at substantially uniform time intervals.

7. The method of obtaining a succession of mold charges of predetermined weights varying in a recurring cyclic order, which comprises intermittently discharging molten glass through an outlet, severing the discharged portions, and retarding further discharge, at the ends of equal time periods within each of said cycles, and resuming the discharge at the ends of unequal time periods within each of said cycles.

8. The method of making articles of glassware of different sizes from molten glass discharged from an outlet, which includes the steps of intermittently retarding the discharge at the end of uniform time periods, resuming the normal discharge at such time periods, periodically varying in a fixed order in periodically recurring cycles as will produce successive mold charges of the required varying weights in each of said cycles, severing the charges, and shaping the different size charges in molds suited for the different articles.

9. The method of making successive articles of glassware of different sizes from molten glass discharged from an outlet, which comprises varying, in periodically recurring cycles by means of a discharge controlling implement movable below the outlet, the successive time periods of discharge from the outlet to form charges of different weights, severing the charges from the resulting discharges with constant frequency, and delivering the charges to their respective glassware forming instrumentalities.

10. In apparatus for segregating gathers from a supply of molten glass in a container having a submerged discharge outlet, the combination of a discharge controlling implement movable periodically below the outlet at the end of equal time intervals to control the discharge of glass therefrom, means for periodically severing successive portions of discharged glass, and means for operating the implement to allow the discharge at the end of unequal time intervals of successive portions of the glass that vary in weight in a fixed cyclic order.

11. In apparatus for separating mold charges from molten glass in a container having a submerged discharge outlet, the combination of a discharge controlling implement located below the outlet, and a plurality of means operating in recurring cycles of equal duration for actuating the implement for varying periods of time in each cycle to vary the duration of the successive discharges of glass from the outlet, means for periodically severing mold charges from the discharged glass, and means for actuating the severing means in timed relation to the movements of the implement and with constant frequency, whereby mold charges varying in size in a predetermined cycle are produced.

12. In apparatus for segregating gathers from molten glass, the combination of a container having a discharge outlet, means for periodically applying differential pneumatic pressure to the glass above and below the outlet to control the discharge therefrom, means operating in a cyclic order for automatically varying the duration of intervals of time between successive applications of differential pressures, whereby successive gathers of predetermined weight are discharged from the outlet during successive intervals of pressure release occurring in the predetermined cycle of operation, and periodically acting means for severing mold charges of a plurality of different weights from said gathers.

13. In apparatus for separating mold charges from molten glass, the combination of a container having a discharge outlet, means operating in periodically recurring cycles for applying differential pneumatic pressure to the glass above and below the outlet to control the discharge of glass therefrom, means for automatically varying the duration of the intervals of time between successive applications of said differential pressures within each of said cycles, and for thereby causing the successive quantities of the glass issuing from said outlet to vary in regular order during each of said cycles, and means operating in timed relation to the times of beginning said pressure applications to sever mold charges from the discharged glass, whereby successive mold charges of varying and predetermined weight are produced in the intervals of released pressure in the predetermined cycle of operation.

14. In apparatus for segregating gathers from molten glass contained in a container having a discharge outlet, the combination of means for producing a series of mold charges, means for retarding the discharge of glass at the ends of uniform periods of time in periodically recurring cycles, and means for discontinuing the retardation at the ends of varying periods of time in each of said cycles, whereby the duration of the discharge periods is automatically varied during the cycle of producing a series of charges.

15. In apparatus for feeding mold charges of a plurality of different weights in a cyclic order from a supply of molten glass in a container having a submerged outlet, the combination of a discharge controlling implement located below the outlet, a plurality of means operating in a cyclic order for actuating said implement to stop discharge of glass from the outlet for unequal periods of time and to permit discharge from the outlet in the intervals between such periods of stoppage, and means for severing mold charges from the discharged glass at the ends of equal periods of time, whereby mold charges varying in size in a cyclic order are obtained.

16. In glass feeding apparatus, a container for molten glass having an outlet in its base, a movable supporting member adjacent to said container, a discharge regulating member outside of said container and movable with said supporting member from said outlet, a periodically operated member for periodically actuating said supporting member to move said discharge regulating member toward the outlet, and means adjustable on said supporting member for cooperating with said actuating member to vary the position of the path of movement of said discharge regulating member relatively to the outlet.

17. In glass feeding apparatus, a container for molten glass having an outlet in its base, a vertically movable support adjacent to the container, a cup carried by said support for movement with the support toward and from the outlet, a collar adjustable vertically on said support, a periodically operated actuating member having a portion in contact with said collar for periodically raising said support and said cup, and means for supplying pressure fluid to said cup sufficient when said cup is at the end of its stroke nearest to the outlet to retard discharge of glass from the outlet.

18. Apparatus for feeding molten glass comprising a container for the glass having a downwardly opening discharge outlet, a cup adapted for movement to and from a position adjacent to and substantially in line with said outlet, means for supporting and operating said cup to move it periodically to and from its said position adjacent to the outlet, and means for supplying pressure fluid to the cup, including a valve directly responsive to the operation of said cup supporting and operating means to cause an increased flow of pressure fluid from said supply means when the cup moves to its said position adjacent to the outlet.

19. Apparatus for feeding molten glass comprising a container for the glass having a downwardly opening discharge outlet, a cup adapted for movement to and from a position adjacent to and substantially in line with said outlet, means for supporting and operating said cup to move it periodically to and from its said position adjacent to the outlet, and means for supplying pressure fluid to the cup, including a valve directly responsive to the operation of said cup supporting and operating means to cause an increased flow of pressure fluid from said supply means when the cup moves to its said position adjacent to the outlet, said valve being actuated automatically to restrict the flow of pressure fluid as the cup moves away from said discharge outlet.

Signed at Hartford, Connecticut, this 24th day of March, 1922.

KARL E. PEILER.

CERTIFICATE OF CORRECTION.

Patent No. 1,828,438.                               Granted October 20, 1931, to

KARL E. PEILER.

It is hereby certified that error appears in the printed specification of the above numbered patent requiring correction as follows: Page 5, line 2, claim 4, after the syllable "riods" and before the period insert the words in each of said cycles; and that the said Letters Patent should be read with this correction therein that the same may conform to the record of the case in the Patent Office.

Signed and sealed this 17th day of November, A. D. 1931.

(Seal)                                                             M. J. Moore,
                                                           Acting Commissioner of Patents.